United States Patent
Ohara

(10) Patent No.: US 10,354,148 B2
(45) Date of Patent: Jul. 16, 2019

(54) OBJECT DETECTION APPARATUS, VEHICLE PROVIDED WITH OBJECT DETECTION APPARATUS, AND NON-TRANSITORY RECORDING MEDIUM

(71) Applicant: KYOCERA Corporation, Kyoto (JP)

(72) Inventor: Naoto Ohara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/358,438

(22) Filed: Nov. 22, 2016

(65) Prior Publication Data

US 2017/0076160 A1    Mar. 16, 2017

Related U.S. Application Data

(63) Continuation of application No. PCT/JP2015/002705, filed on May 28, 2015.

(30) Foreign Application Priority Data

May 28, 2014    (JP) ................. 2014-110239

(51) Int. Cl.
*B60R 1/00*      (2006.01)
*G06K 9/00*     (2006.01)
(Continued)

(52) U.S. Cl.
CPC ............ *G06K 9/00791* (2013.01); *B60R 1/00* (2013.01); *G06K 9/4671* (2013.01);
(Continued)

(58) Field of Classification Search
CPC ..... G06K 9/00791; G06K 9/4671; B60R 1/00
See application file for complete search history.

(56) References Cited

U.S. PATENT DOCUMENTS

2008/0175436 A1*  7/2008  Asari ................. B60R 1/00
                                                             382/103
2009/0009603 A1   1/2009  Kim
(Continued)

FOREIGN PATENT DOCUMENTS

JP    H07-225126 A    8/1995
JP    2008-276308 A   11/2008
(Continued)

OTHER PUBLICATIONS

An Office Action issued by the Japanese Patent Office dated Jun. 20, 2017, which corresponds to Japanese Patent Application No. 2016-523160 and is related to U.S. Appl. No. 15/358,438; with English language concise explanation.

(Continued)

*Primary Examiner* — Kim Y Vu
*Assistant Examiner* — Molly Delaney
(74) *Attorney, Agent, or Firm* — Studebaker & Brackett PC

(57) ABSTRACT

An object detection apparatus includes an imaging unit installed in a vehicle that images the surroundings of the vehicle and a controller that changes, in accordance with driving conditions of the vehicle, at least one of a position of at least one region among regions in which object detection is performed in an image captured by the imaging unit, a shape of at least one of the regions, and the number of regions, the regions including a first region and a second region wider than the first region.

10 Claims, 7 Drawing Sheets

(51) Int. Cl.
*G06K 9/46* (2006.01)
*G08G 1/16* (2006.01)

(52) U.S. Cl.
CPC ... *B60R 2300/107* (2013.01); *B60R 2300/207* (2013.01); *B60R 2300/30* (2013.01); *B60R 2300/302* (2013.01); *B60R 2300/306* (2013.01); *B60R 2300/8093* (2013.01); *G08G 1/16* (2013.01)

(56) References Cited

U.S. PATENT DOCUMENTS

| | | | |
|---|---|---|---|
| 2011/0261168 A1* | 10/2011 | Shima | B60T 7/22 348/47 |
| 2012/0185167 A1* | 7/2012 | Higuchi | G01C 21/3602 701/461 |
| 2012/0300072 A1 | 11/2012 | Kim | |
| 2013/0073194 A1 | 3/2013 | Nakamura et al. | |
| 2013/0162829 A1* | 6/2013 | Kadowaki | B62D 15/028 348/148 |
| 2014/0022378 A1* | 1/2014 | Higgins-Luthman | B60R 1/00 348/113 |
| 2014/0347470 A1* | 11/2014 | Zhang | B60R 1/00 348/118 |
| 2015/0165972 A1 | 6/2015 | Takemae et al. | |
| 2015/0178582 A1 | 6/2015 | Okada et al. | |
| 2015/0375680 A1* | 12/2015 | Watanabe | B60R 1/00 701/36 |
| 2017/0096106 A1* | 4/2017 | Higuchi | B60R 1/00 |

FOREIGN PATENT DOCUMENTS

| | | |
|---|---|---|
| JP | 2012-252501 A | 12/2012 |
| JP | 2013-061919 A | 4/2013 |
| JP | 2014-002608 A | 1/2014 |
| WO | 2014/017104 A1 | 1/2014 |

OTHER PUBLICATIONS

International Search Report issued in PCT/JP2015/002705; dated Aug. 11, 2015.
Written Opinion issued in PCT/JP2015/002705; dated Aug. 11, 2015; with English language Concise Explanation.
An Office Action issued by the Japanese Patent Office dated Feb. 6, 2018, which corresponds to Japanese Patent Application No. 2016-523160 and is related to U.S. Appl. No. 15/358,438; with English language concise explanation.

* cited by examiner

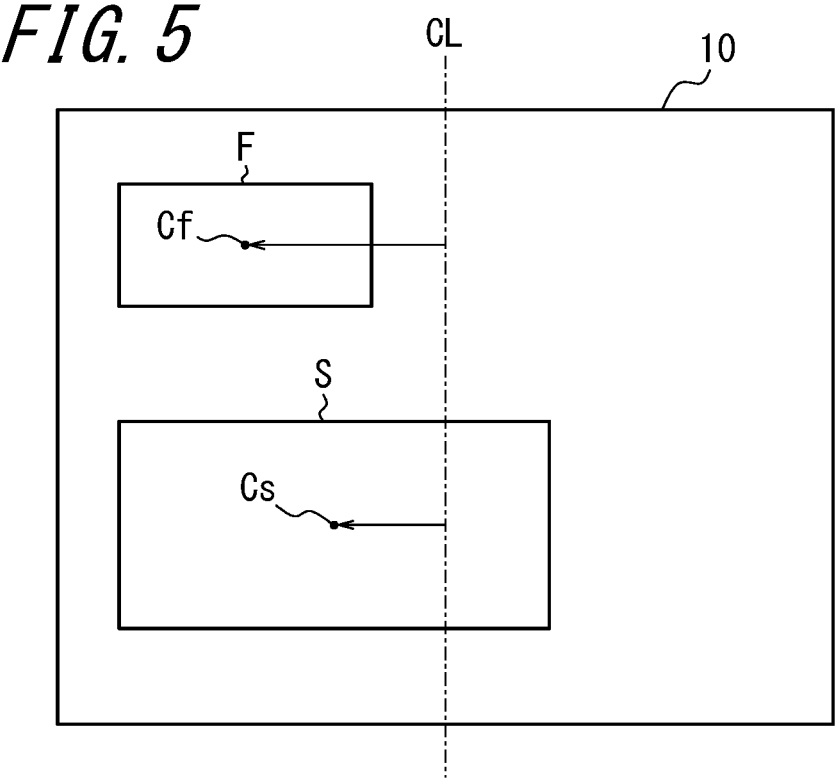
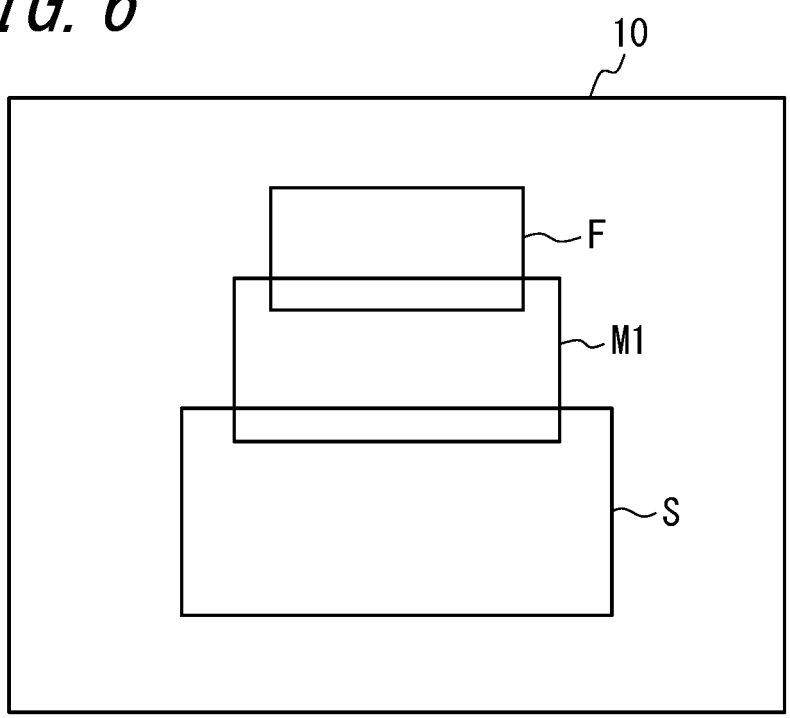

OBJECT DETECTION APPARATUS, VEHICLE PROVIDED WITH OBJECT DETECTION APPARATUS, AND NON-TRANSITORY RECORDING MEDIUM

CROSS-REFERENCE TO RELATED APPLICATION

This application claims priority to and the benefit of Japanese Patent Application No. 2014-110239 filed May 28, 2014, the entire contents of which are incorporated herein by reference.

TECHNICAL FIELD

This disclosure relates to an object detection apparatus and a vehicle provided with an object detection apparatus.

BACKGROUND

One example of a road object recognition apparatus for a vehicle partitions the wide range of an image, which captures the road and objects on the road, into fixed windows and performs object recognition on subjects in each window (for example, JP H07-225126 A (PTL 1)). The subject for which object detection is to be performed and the position of the subject within the captured image differ depending on driving conditions (for example, speed and steering). When the windows are fixed as in PTL 1, the windows for performing object detection need to be set over a wide range in order to deal with a variety of driving conditions.

CITATION LIST

Patent Literature

PTL 1: JP H07-225126 A

SUMMARY

An object detection apparatus according to this disclosure includes an imaging unit installed in a vehicle and configured to image surroundings of the vehicle, and performs object detection in an image captured by the imaging unit. The object detection apparatus includes a controller configured to change, in accordance with a driving condition of the vehicle, at least one of a position of at least one region among regions, a shape of at least one region among the regions, and a total number of the regions, the regions including a first region and a second region wider than the first region.

A vehicle according to this disclosure is provided with an object detection apparatus. The object detection apparatus includes an imaging unit installed in a vehicle and configured to image surroundings of the vehicle; and a controller. The controller is configured to change at least one of a position of at least one region among regions in which object detection is performed in an image captured by the imaging unit, a shape of at least one region among the regions, and a total number of the regions, the regions including a first region and a second region wider than the first region. The controller makes the change in accordance with a driving condition of the vehicle.

BRIEF DESCRIPTION OF THE DRAWINGS

In the accompanying drawings:

FIG. 5 illustrates a captured image of the area ahead of a vehicle according to one of the disclosed embodiments;

FIG. 6 illustrates a captured image of the area ahead of a vehicle according to one of the disclosed embodiments;

DETAILED DESCRIPTION

The following describes one of the embodiments of this disclosure based on the drawings.

Figure 1:
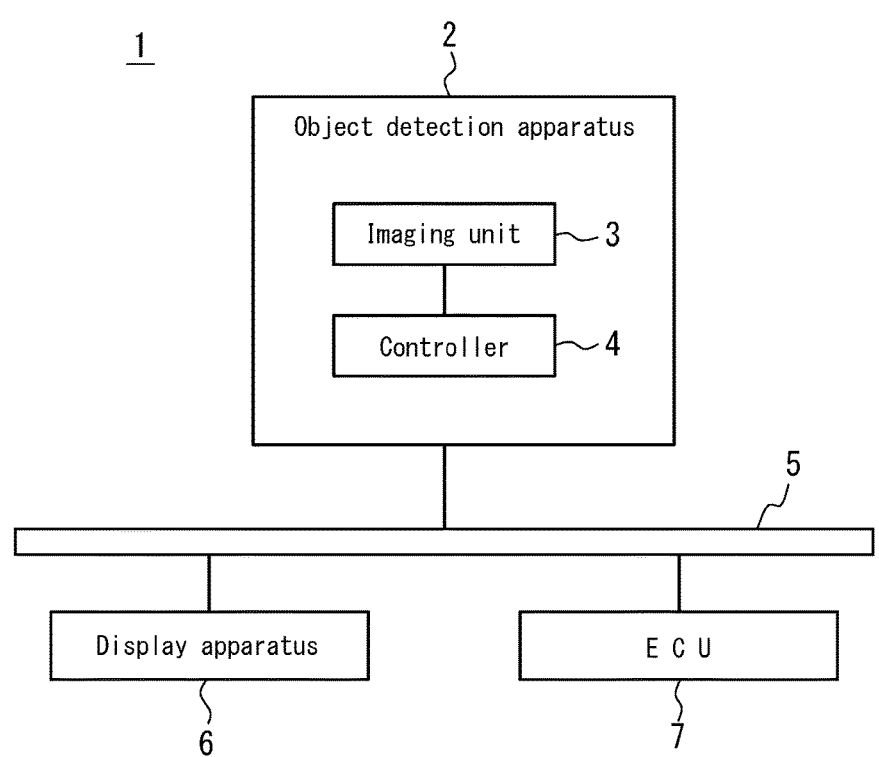
FIG. 1 is a functional block diagram of an object detection system according to one of the disclosed embodiments.

As illustrated in FIG. 1, an object detection system 1 according to an embodiment includes an object detection apparatus 2, a bus 5, a display apparatus 6, and an Electronic Control Unit (ECU) 7. Although the functions of the object detection system 1 according to this disclosure are described, it should be noted that other functions provided in the object detection system 1 are in no way excluded. The object detection apparatus 2 according to this embodiment is, for example, assumed to be installed in a vehicle such as an automobile, but the object detection apparatus 2 may be installed and used in a vehicle other than an automobile.

As illustrated in FIG. 1, in the object detection system according to this embodiment, the object detection apparatus 2, display apparatus 6, and ECU 7 are connected to the bus 5 and communicate by the Controller Area Network (CAN) standard via the bus 5. The object detection apparatus 2, display apparatus 6, and ECU 7 may communicate with a different communication standard than CAN.

Electronic device-related elements other than the elements illustrated in FIG. 1 are also connected to the bus 5. Among the functional units with which the automobile is configured, however, the following explanation in particular focuses on elements for which a variety of information, such as images, is acquired and elements for which a variety of information, such as images, is output as video. Elements constituting other functional units are omitted from the drawings and are not described.

The object detection apparatus 2 is, for example, a mono camera or a stereo camera and includes an imaging unit 3 and a controller 4. The imaging unit 3 includes an optical system with a wide field of view and an image pickup device, such as a CMOS or a CCD. The image pickup device captures the image formed by the optical system.

The controller 4 acquires a captured image captured by the imaging unit 3. The controller 4 also acquires information on the driving conditions from the ECU 7. While details are provided below, the controller 4 sets the position and shape of at least one of regions for performing object detection (subject detection) in the captured image, the regions including a first region and a second region, and sets the number of regions. Furthermore, the controller 4 performs object detection only in the regions for which performance of object detection is set. Alternatively, the controller 4 may be configured not to perform object detection only in those regions, but instead to perform object detection in those regions with higher accuracy than in other regions.

The controller 4 outputs a predetermined signal (for example, a signal to cause an external device to execute a warning, speed adjustment, steering adjustment, braking adjustment, or the like) in accordance with the result of executing object detection (for example, whether a subject is present in the region and the type of subject). The controller 4 can also extract all or a portion of the captured image, execute predetermined image processing (for example, color interpolation, white balance adjustment, γ correction, or the like), and output the result as a display image.

The object detection apparatus 2 outputs the image subjected to various control by the controller 4 and causes the image to be displayed on the display apparatus 6. In this embodiment, the object detection apparatus 2 is provided with the controller 4, as illustrated in FIG. 1, which is described as a unit that executes a variety of related control. In FIG. 1, the object detection apparatus 2 is depicted in a form including the imaging unit 3 and the controller 4 in a single housing. The object detection apparatus 2 may, however, be configured instead by having a camera module function as the imaging unit and having an MPU external to the camera module function as the controller thereof.

The display apparatus 6 is configured, for example, by a liquid crystal display, organic EL display, or the like, and displays a variety of information, videos, and the like. The display apparatus 6 may, for example, be configured by a touch panel. For example, the display apparatus 6 can display different types of vehicle information and can display a navigation system screen using a GPS or the like. In this embodiment, the display apparatus 6 can also display video output by the object detection apparatus 2.

The ECU 7 controls the various systems installed in the vehicle. In this embodiment, the ECU 7 is, for example, an ECU for the engine, brakes, steering, turn signals, and lighting. As driving conditions, the ECU 7 acquires information on speed, acceleration, braking operations, steering wheel angle, direction indicated by the turn signals, lighting state (lights on or off, high beam or low beam) and the like from various devices in the vehicle. The ECU 7 uses the acquired driving conditions to control the various systems. The ECU 7 also outputs the acquired driving conditions to the controller 4.

Figure 2:
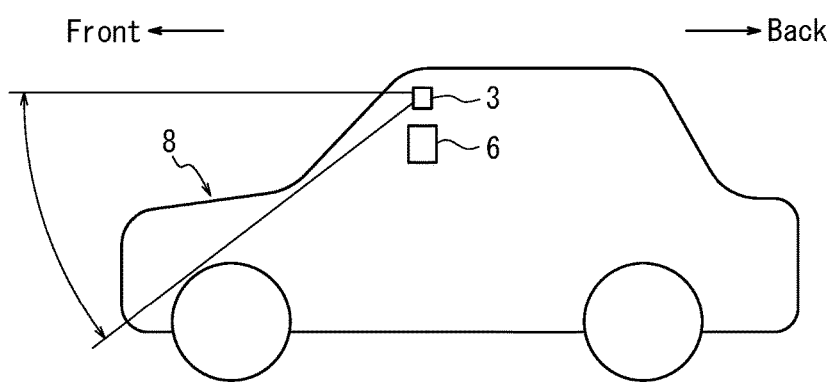
FIG. 2 illustrates a vehicle provided with an object detection apparatus according to one of the disclosed embodiments.

As illustrated in FIG. 2, at least the imaging unit 3 and the display apparatus 6 are installed in the vehicle 8. The imaging unit 3 is installed at a position that allows imaging of the area in front of the vehicle 8 (such as a position inside the vehicle 8, in contact with the windshield) and images the surroundings of the vehicle 8. In greater detail, the imaging unit 3 images the road and objects on the road.

In FIG. 2, the object detection apparatus 2 is installed at a position that allows imaging of the area in front of the vehicle 8, but instead of the area in front, the object detection apparatus 2 may be installed and used at a position that allows imaging of the surrounding area, such as the area on the side or the area behind the vehicle 8.

Next, processing executed by the controller 4 in the captured image is described. During this processing, the controller 4 sets the position, shape, and number of Regions Of Interest (ROI) for performing object detection.

Figure 3:
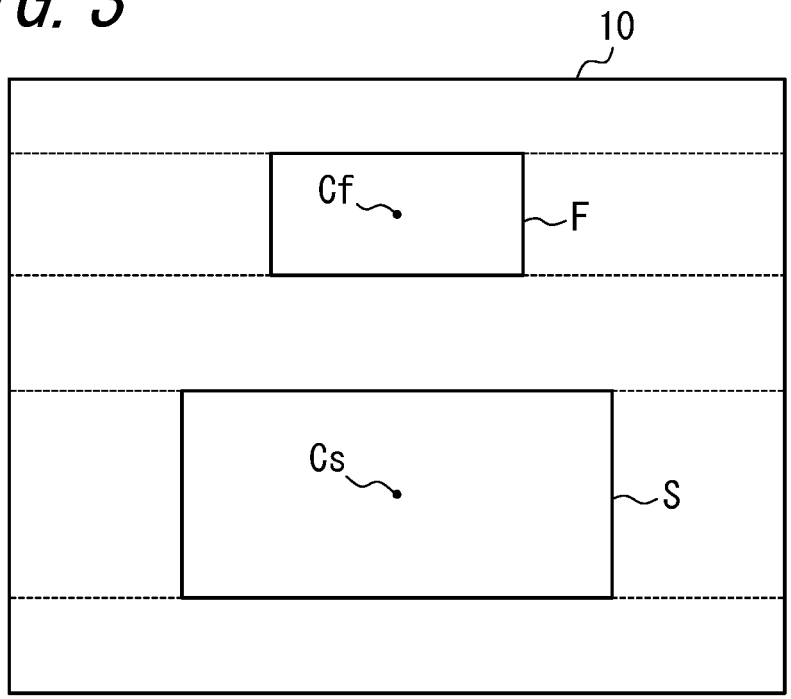
FIG. 3 illustrates a captured image of the area ahead of a vehicle according to one of the disclosed embodiments.

FIG. 3 illustrates a captured image 10, of the area in front of the vehicle 8, captured by the imaging unit 3 and output to the controller 4. The object detection apparatus 2 performs object detection at least at positions in the image corresponding to a relatively far position (for example, 70 m to 80 m in front of the vehicle 8) and a relatively close position (for example, 5 m to 40 m in front of the vehicle 8) with respect to the vehicle 8 provided with the object detection apparatus 2. The relatively far position and relatively close position respectively correspond to the first region F and the second region S in the captured image 10. Therefore, the first region F can be considered to be set to a subject region that is farther from the vehicle 8 than the second region S is. The regions are not limited to being rectangular.

By specification, the imaging unit 3 is installed in the vehicle 8 with a predetermined orientation. As illustrated in FIG. 3, with this orientation, the positional relationship in the vertical direction between the first region F and the second region S is established in advance. As illustrated in FIG. 3, a reference position Cf of the first region F (for example, the center of the region) is positioned further upward in the captured image 10 than a reference position Cs of the second region S.

The first region F is relatively smaller than the second region S. The reason is that the same subject becomes smaller in the captured image with increased distance from the vehicle 8.

When the acquired driving conditions include directional information related to the horizontal direction of travel of the vehicle 8 (for example, information on the steering angle or operating information on the turn signals), the controller 4 sets the lateral positions in the captured image 10 of the first region F and the second region S based on the driving conditions.

Figure 4:
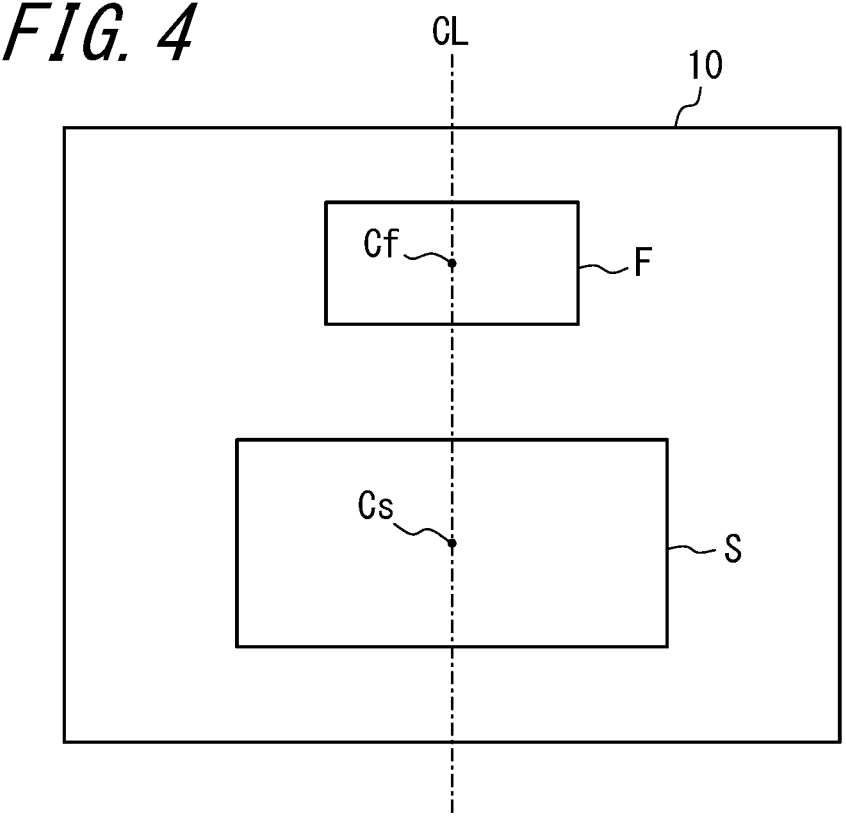
FIG. 4 illustrates a captured image of the area ahead of a vehicle according to one of the disclosed embodiments.

FIG. 4 illustrates the captured image 10, of the area in front of the vehicle 8, captured by the imaging unit 3. For example, when determining that the vehicle 8 is traveling straight based on the driving conditions, the controller 4 sets the lateral positions of the first region F and the second region S so that the reference positions Cf and Cs of the first region F and the second region S overlap with the center line CL in the lateral direction of the captured image 10. The reference positions Cf and Cs are the image centers indicated by the dots in FIG. 4. This position is referred to as the center position.

FIG. 5 illustrates the captured image 10, of the area in front of the vehicle 8, captured by the imaging unit 3. When determining that the vehicle 8 is traveling to the left based on the driving conditions, the controller 4 executes the following processing. As illustrated in FIG. 5, the controller 4 sets the lateral positions of the first region F and the second region S so that the reference positions Cf and Cs of the first region F and the second region S are positioned to the left of the center line CL of the captured image 10. When setting the lateral positions of the first region F and the second region S, the controller 4 sets the positions so that the amount of displacement of the first region F from the center position is greater than the amount of displacement of the second region S. Furthermore, the controller 4 may set the lateral position of the first region F and the second region S in accordance with the degree of steering of the vehicle 8. For example, as the degree of steering of the vehicle 8 increases, the controller 4 may set the lateral position of the first region F and the second region S to be a position with an increasing amount of displacement from the center position.

When the driving conditions include speed information related to the speed of the vehicle 8, then based on this information, the controller 4 further sets the number of regions for performing object detection between the first region F and the second region S. There may be any number of regions before and after the change, but as an example, the number of regions before the change is two in the following case.

FIG. 6 illustrates the captured image 10, of the area in front of the vehicle 8, captured by the imaging unit 3. When determining that the speed of the vehicle 8 exceeds a first threshold based on the driving conditions, then as illustrated in FIG. 6, the controller 4 sets a region of a predetermined size between that of the first region F and the second region S as a third region M1. In this case, the positions of the first region F and the second region S may respectively be shifted vertically to set the third region M1. Without shifting the positions of the first region F and the second region S, the third region M1 may also be set so as to overlap at least one of the other regions, or so as not to overlap any other region. The position at which the third region M1 is set is not limited to being between the first region F and the second region S.

Figure 7:
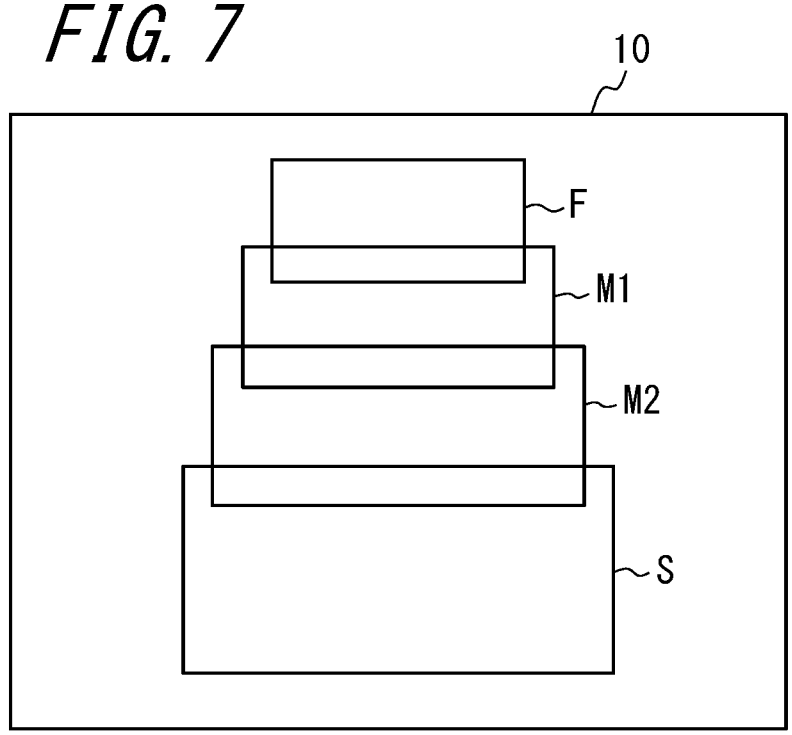
FIG. 7 illustrates a captured image of the area ahead of a vehicle according to one of the disclosed embodiments.

FIG. 7 illustrates the captured image 10, of the area in front of the vehicle 8, captured by the imaging unit 3. Furthermore, when determining that the speed of the vehicle 8 exceeds not only the first threshold but also a second threshold based on the driving conditions, then as illustrated in FIG. 7, the controller 4 may set a fourth region M2 in the captured image 10. The fourth region M2 may be set at any position, in the same way as the position at which the third region M1 is set.

When the driving conditions include lighting information related to the conditions of the lighting (such as headlights), then based on this information, the controller 4 changes the shape of at least one of the first region F and the second region S.

Figure 8:
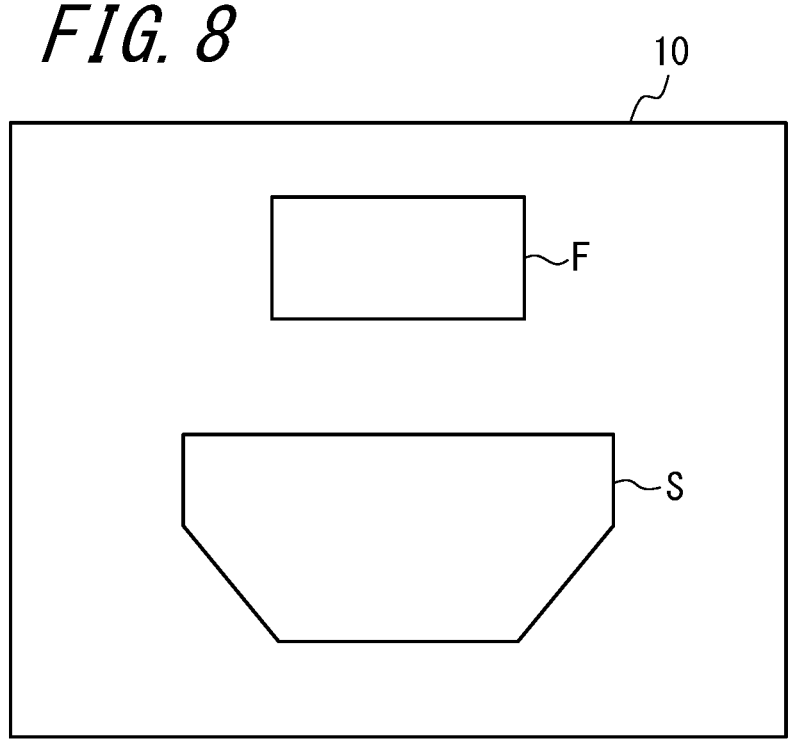
FIG. 8 illustrates a captured image of the area ahead of a vehicle according to one of the disclosed embodiments.

FIG. 8 illustrates the captured image 10, of the area in front of the vehicle 8, captured by the imaging unit 3. For example, when determining, based on the driving conditions, that the conditions of lighting have changed from high beam to low beam or vice versa, or from off to on, the controller 4 executes the following processing. As illustrated in FIG. 8, the controller 4 changes the shape of the second region S so as to match the illumination range of light emitted from the headlights or the like. The controller 4 changes the shape of the first region F in accordance with the illumination range of light.

As described above, based on the driving conditions acquired from the ECU 7, the controller 4 sets the position, shape, and number of regions in which object detection is to be performed in the image acquired from the imaging unit 3. The controller 4 continuously sets the position, shape, and number of regions in which object detection is to be performed, and as a result, the position, shape, and number of regions in which object detection is to be performed change in accordance with driving conditions.

Next, the processing executed by the controller 4 for object detection in the set regions is described briefly. By executing object detection processing, such as super-resolution image interpolation, cropping, gradient calculation, HOG that for example uses SVM learning data, or the like on the first region F, the controller 4 determines whether a predetermined subject, such as a vehicle, is present in the first region F. By executing object detection processing, such as cropping, gradient calculation, HOG that for example uses SVM learning data, or the like on the second region, the controller 4 also determines whether a predetermined subject, such as a vehicle, is present in the second region. As necessary, the controller 4 may also execute other image processing, such as distortion correction, edge enhancement, contrast adjustment, gamma adjustment, or the like on each region. The controller 4 may execute the same or different image processing on each region.

In this way, the controller 4 according to one of the disclosed embodiments changes at least one of the position, shape, and number of regions in accordance with driving conditions and performs object detection. Therefore, object detection no longer needs to be performed over a wide range of the image acquired from the imaging unit 3. As a result, the amount of image processing decreases, making it possible to perform object detection with a reduced system load while dealing with a variety of driving conditions.

Figure 9:
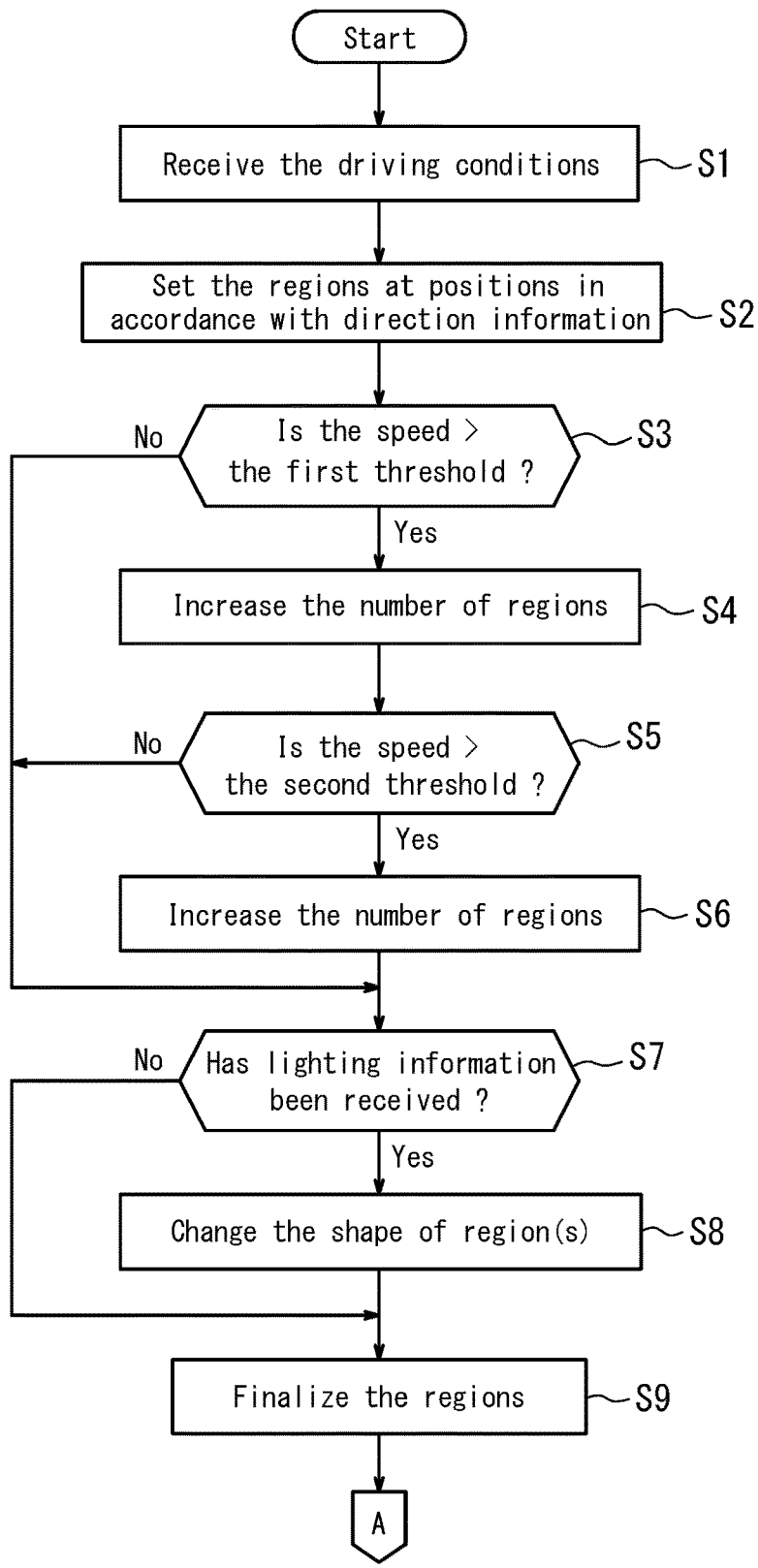
FIG. 9 is a flowchart of operations by an object detection apparatus according to one of the disclosed embodiments.

FIG. 9 is a flowchart of operations by an object detection apparatus according to one of the disclosed embodiments. The controller receives the driving conditions from the ECU (step S1). The controller then sets the regions for performing object detection in the captured image acquired from the imaging unit to positions in accordance with direction information (step S2). For example, when determining that the vehicle is traveling straight, the controller sets the regions at a center position where the reference position (for example, the center) of the region and the center line of the captured image overlap. When determining that the vehicle is traveling to the left, the controller sets the lateral position of each region so that the reference position of the region is positioned to the left of the center line of the captured image. At this time, the lateral positions may be set so that among the regions, a region at a relatively close position to the vehicle is displaced a relatively small amount to the left, and a region at a relatively far position from the vehicle is displaced a relatively large amount to the left.

Next, based on the speed information included in the driving conditions acquired from the ECU, the controller determines whether the speed of the vehicle is greater than a first threshold (step S3). When the speed is greater (step S3: Yes), the controller increases the number of regions (step S4). The regions may be increased to any number. For example, when the speed of the vehicle is greater than 60 km/h, a region for performing object detection may be newly set between the regions. It should be noted that the region may be set at any position. Furthermore, the controller determines whether the speed acquired from the ECU is greater than a second threshold that exceeds the first threshold (step S5). When the speed is greater (step S5: Yes), the controller further increases the number of regions for performing object detection (step S6). For example, when the speed of the vehicle is greater than 80 km/h, a new region may be further set. On the other hand, when determining that the speed is not greater in step S3 (step S3: No), the controller does not change the number of regions.

When lighting information is included in the driving conditions acquired from the ECU (step S7: Yes), the controller changes the shape of a region so as to match the illumination range of light emitted from the headlights or the like (step S8). Conversely, when not receiving lighting information (step S7: No), the controller does not change the shape of a region.

In this way, in accordance with driving conditions, the controller sets the position, shape, and number of regions in which object detection is to be performed and finalizes the regions (step S9).

In step S3 to step S6, the number of regions is only increased when the speed of the vehicle is greater than a predetermined threshold (first threshold or second threshold), but as a modification, the number of regions may be decreased when the speed of the vehicle is less than a predetermined threshold.

Figure 10:
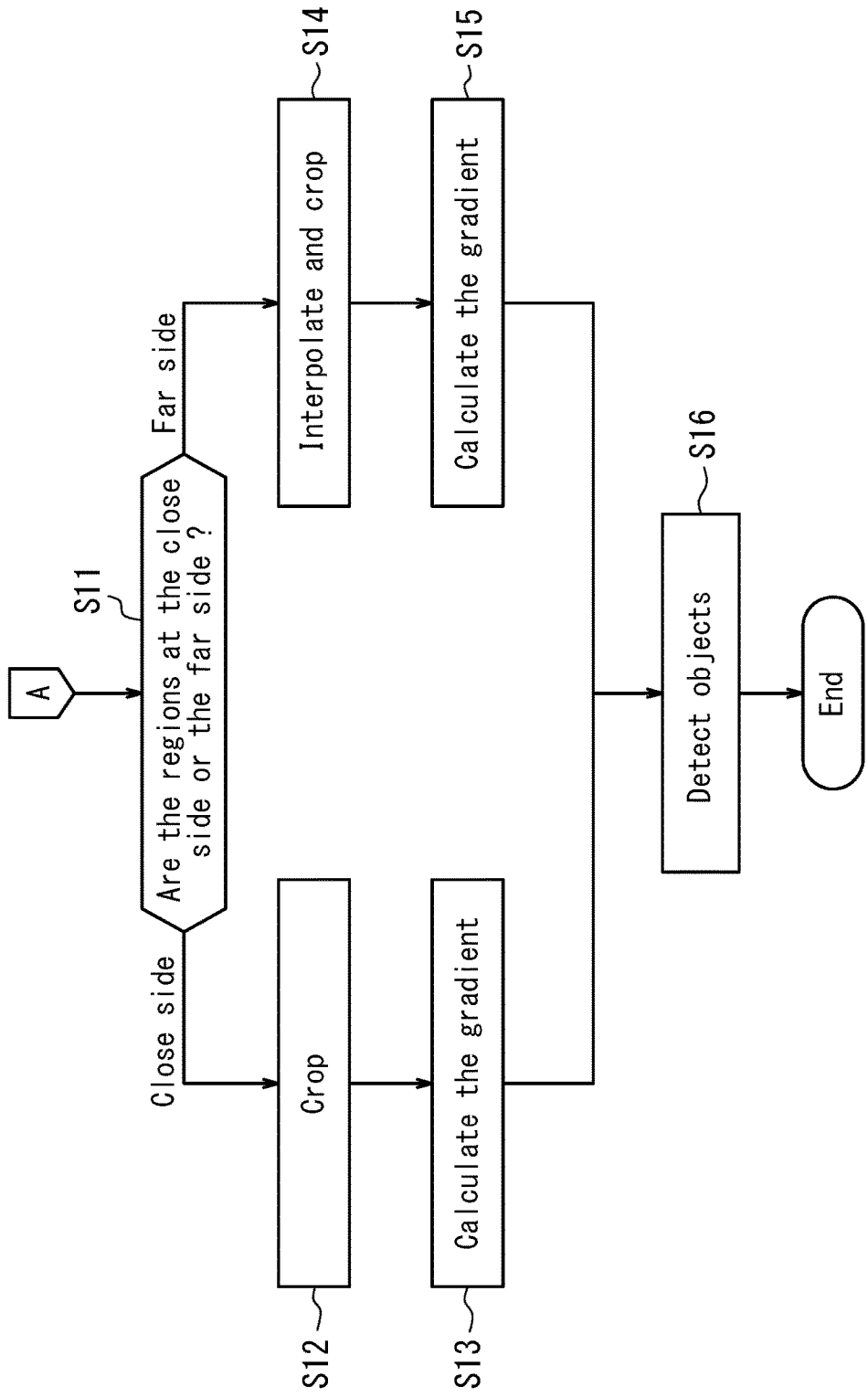
FIG. 10 is a flowchart of operations by an object detection apparatus according to one of the disclosed embodiments.

FIG. 10 is a flowchart of operations by an object detection apparatus according to one of the disclosed embodiments.

The controller determines whether the finalized regions are at a position relatively close to (close side) or relatively far from (far side) the vehicle (step S11). The controller determines whether each region is at the close side or the far side by whether the region is positioned at the lower part or the upper part of the image. Next, the controller performs cropping on a region at the close side (step S12) and then calculates the gradient (step S13). For a region at the far side, the controller performs image interpolation and cropping (step S14) and then calculates the gradient of the region (step S15). Finally, the controller executes object detection processing (step S16). The controller executes object detection in this way to determine whether a predetermined subject is present in the regions.

In this way, in accordance with driving conditions, the controller finalizes the regions in which object detection is to be performed and only performs object detection in those regions. Therefore, object detection no longer needs to be performed over a wide range of the captured image acquired from the imaging unit. As a result, the amount of image processing decreases, thereby making it possible to perform object detection with a reduced system load while dealing with a variety of driving conditions.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various members, units, steps, and the like may be reordered in any logically consistent way. Furthermore, when embodying a method according to this disclosure, units or steps may be combined into one or divided.

When the object detection apparatus according to this disclosure is configured by a computer, a program containing a description of the processing for achieving the functions is stored within the computer or in an external memory. The object detection apparatus is achieved by the central processing unit (CPU) of the computer reading and executing the program. Such a program may, for example, be distributed by the sale, transfer, lending, or the like of a portable recording medium such as a DVD, CD-ROM, or the like. Such a program may also, for example, be distributed by being stored in the memory of a server on a network and then transferred from the server to another computer over the network. For example, the computer that executes such a program can temporarily store, in its own memory, the program recorded on the portable recording medium or transferred from the server. As another embodiment of the program, a computer may read the program directly from the portable recording medium and execute processing in accordance with the program. Also, each time the program is transferred from the server to the computer, the computer may execute processing in accordance with the received program.

REFERENCE SIGNS LIST

1 Object detection system
2 Object detection apparatus
3 Imaging unit
4 Controller
5 Bus
6 Display apparatus
7 ECU
8 Vehicle
10 Captured image

The invention claimed is:

1. An object detection apparatus comprising:
an imager installed in a vehicle and that images surroundings of the vehicle; and
a controller that changes, in accordance with a driving condition of the vehicle, at least one of
a position of at least one region among regions in which object detection is performed in an image captured by the imager,
a shape of at least one region among the regions, and
a total number of the regions, the regions including a first region and a second region wider than the first region, the second region being set to a region corresponding to a subject that is closer from the vehicle than the first region is, wherein
each of the imager and the controller comprises at least a processor, and
the regions are simultaneously set in the image.

2. The object detection apparatus of claim 1, wherein the driving condition includes at least one of a turn signal operation and a lighting state.

3. The object detection apparatus of claim 1, wherein the driving condition includes at least one of a speed and a steering angle.

4. The object detection apparatus of any one of claim 1, wherein the controller is further configured to execute predetermined image processing on each of the regions.

5. The object detection apparatus of claim 4, wherein the predetermined image processing is at least one of distortion correction and image interpolation.

6. The object detection apparatus of claim 1, wherein the first region is set to a subject region farther from the vehicle than the second region is.

7. The object detection apparatus of claim 1, wherein a reference position of the first region is positioned in a higher portion of the image than a reference position of the second region is.

8. The object detection apparatus of claim 6, wherein an amount of displacement of a position of the first region and of a position of the second region in accordance with the driving condition is greater for the first region than for the second region.

9. A vehicle provided with an object detection apparatus, the object detection apparatus comprising:
an imager installed in a vehicle and that images surroundings of the vehicle; and
a controller that changes, in accordance with a driving condition of the vehicle, at least one of
a position of at least one region among regions in which object detection is performed in an image captured by the imager,
a shape of at least one region among the regions, and
a total number of the regions, the regions including a first region and a second region wider than the first region, the second region being set to a region corresponding to a subject that is closer from the vehicle than the first region is, wherein
each of the imager and the controller comprises at least a processor, and
the regions are simultaneously set in the image.

10. A computer-readable non-transitory recording medium storing instructions to be executed by a computer, the instructions comprising:
   imaging surroundings of a vehicle; and
   changing, in accordance with a driving condition of the vehicle, at least one of
   a position of at least one region among regions in which object detection is performed in an image captured by the imaging,
   a shape of at least one region among the regions, and
   a total number of the regions, the regions including a first region and a second region wider than the first region, the second region being set to a region corresponding to a subject that is closer from the vehicle than the first region is, wherein
   the regions are simultaneously set in the image.

* * * * *